(12) United States Patent
Nagai et al.

(10) Patent No.: US 11,149,595 B2
(45) Date of Patent: Oct. 19, 2021

(54) JOINING APPARATUS AND METHOD OF JOINING

(71) Applicant: HONDA MOTOR CO., LTD., Tokyo (JP)

(72) Inventors: Hiroyuki Nagai, Tochigi-ken (JP); Takahisa Tashiro, Tochigi-ken (JP); Takeshi Yamazaki, Tochigi-ken (JP); Takefumi Yokoyama, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 16/455,797

(22) Filed: Jun. 28, 2019

(65) Prior Publication Data
US 2020/0003086 A1 Jan. 2, 2020

(30) Foreign Application Priority Data
Jun. 29, 2018 (JP) .............................. JP2018-124848

(51) Int. Cl.
| | | |
|---|---|---|
| *B23K 11/30* | (2006.01) | |
| *B23K 11/093* | (2006.01) | |
| *F01L 3/22* | (2006.01) | |
| *B23K 101/00* | (2006.01) | |

(52) U.S. Cl.
CPC ............. *F01L 3/22* (2013.01); *B23K 11/0935* (2013.01); *B23K 11/3009* (2013.01); *B23K 11/3081* (2013.01); *B23K 2101/006* (2018.08)

(58) Field of Classification Search
CPC ............... B23K 1/0004; B23K 3/0307; B23K 11/0935; B23K 11/087; B23K 11/0873; B23K 11/093; B23K 11/3018; B23K 11/08; B23K 11/3009; B23K 11/3081; B23K 2101/006
See application file for complete search history.

(56) References Cited

U.S. PATENT DOCUMENTS

| | | | | | |
|---|---|---|---|---|---|
| 5,761,806 A | * | 6/1998 | Adachi | ..................... | F01L 3/22 |
| | | | | | 29/888.44 |
| 5,860,401 A | * | 1/1999 | Adachi | ..................... | F02F 1/38 |
| | | | | | 123/188.8 |
| 6,138,351 A | | 10/2000 | Adachi et al. | | |

FOREIGN PATENT DOCUMENTS

| | | |
|---|---|---|
| EP | 0730085 A1 | 9/1996 |
| EP | 0730085 B1 | 1/2000 |
| JP | 3380081 | 9/1996 |

OTHER PUBLICATIONS

Chinese Office Action and Search Report for Chinese Patent Application No. 201910576176.4 dated Dec. 31, 2020.

* cited by examiner

*Primary Examiner* — Christopher J Besler
(74) *Attorney, Agent, or Firm* — Amin, Turocy & Watson, LLP

(57) ABSTRACT

An electrode unit of a joining apparatus includes an abutting section provided with a tapered outer circumferential surface that contacts a tapered pressure-receiving surface by being inserted into an inside of a first metal member. The tapered outer circumferential surface inclines in a direction of getting closer to an axial center of the abutting section from one end side to another end side. At least part of the abutting section has a thickness elastically deformable in such a manner that the tapered outer circumferential surface aligns with the tapered pressure-receiving surface during application of a pressurizing force to the first metal member and a second metal member.

5 Claims, 11 Drawing Sheets

JOINING APPARATUS AND METHOD OF JOINING

CROSS-REFERENCE TO RELATED APPLICATION

This application is based upon and claims the benefit of priority from Japanese Patent Application No. 2018-124848 filed on Jun. 29, 2018, the contents of which are incorporated herein by reference.

BACKGROUND OF THE INVENTION

Field of the Invention

The present invention relates to a joining apparatus and a method of joining that join a first metal member and a second metal member by electrification and pressurization.

Description of the Related Art

For example, Japanese Patent No. 3380081 discloses a joining apparatus that, when joining a first metal member and a second metal member by performing electrification and pressurization between two electrodes, brings an abutting surface of one of the electrodes into contact with a pressure-receiving surface of the first metal member. In this joining apparatus, the pressure-receiving surface and the abutting surface are each tapered inclining with respect to a pressurizing direction.

SUMMARY OF THE INVENTION

In order to generate heat substantially equally in a joining surface of the first metal member and the second metal member and thereby favorably join the first metal member and the second metal member, a mutual taper angle of the pressure-receiving surface and the abutting surface must be highly precisely adjusted to bring the whole of the pressure-receiving surface and the whole of the abutting surface into contact with each other substantially uniformly. However, a shape of the first metal member or electrode sometimes varies at least in a range of machining tolerance, hence it is difficult for the whole of the pressure-receiving surface and the whole of the abutting surface to be brought into contact with each other substantially uniformly. If, as a result, a non-contact region or the like occurs between the pressure-receiving surface and the abutting surface, then there is concern that local abnormal heat generation will occur or an insufficiently heated region will occur, whereby joining quality of the first metal member and the second metal member lowers.

A main object of the present invention is to provide a joining apparatus that can favorably join a first metal member and a second metal member.

Another object of the present invention is to provide a method of joining that can favorably join a first metal member and a second metal member.

One aspect of the present invention is a joining apparatus by which a first joining surface provided on an outer circumferential side of a circular ring-shaped first metal member, and a second joining surface provided on an inner circumferential side of an insertion port of a second metal member into which the first metal member is inserted, are joined by electrification and pressurization, at least part of the first joining surface being tapered inclining in a direction of getting closer to an axial center of the first metal member, from one end side toward the other end side in an axial direction of the first metal member, an inner circumferential side of the first metal member being provided with a tapered pressure-receiving surface inclining in the direction of getting closer to the axial center of the first metal member, from the one end side toward the other end side, the joining apparatus including an electrode unit having an abutting section, the abutting section being provided with a tapered outer circumferential surface that contacts the tapered pressure-receiving surface by being inserted from the one end side toward the other end side into an inside of the first metal member, the tapered outer circumferential surface inclining in a direction of getting closer to an axial center of the abutting section, from the one end side toward the other end side, and at least part of the abutting section having a thickness capable of elastically deforming in such a manner that, during application of a pressurizing force to the first metal member and the second metal member, the tapered outer circumferential surface fits the tapered pressure-receiving surface.

Another aspect of the present invention is a method of joining by which a first joining surface provided on an outer circumferential side of a circular ring-shaped first metal member, and a second joining surface provided on an inner circumferential side of an insertion port of a second metal member into which the first metal member is inserted, are joined by electrification and pressurization using an electrode unit, at least part of the first joining surface being tapered inclining in a direction of getting closer to an axial center of the first metal member, from one end side toward the other end side in an axial direction of the first metal member, an inner circumferential side of the first metal member being provided with a tapered pressure-receiving surface inclining in the direction of getting closer to the axial center of the first metal member, from the one end side toward the other end side, the method of joining including: a contacting step in which, by an abutting section of the electrode unit being inserted from the one end side toward the other end side into an inside of the first metal member, a tapered outer circumferential surface provided on an outer circumference of the abutting section so as to incline in a direction of getting closer to an axial center of the abutting section from the one end side toward the other end side, is brought into contact with the tapered pressure-receiving surface; and a joining step in which the first joining surface and the second joining surface are joined by applying a pressurizing force to the first metal member and the second metal member and performing electrification, in a state where at least part of the abutting section has been elastically deformed in such a manner that the tapered outer circumferential surface fits the tapered pressure-receiving surface.

In the present invention, the tapered outer circumferential surface can be brought into contact with the tapered pressure-receiving surface to apply the pressurizing force, in a state where at least part of the abutting section of the electrode unit has been elastically deformed. In other words, even when variation in shape, and so on, has occurred in the tapered pressure-receiving surface of the first metal member or the tapered outer circumferential surface of the electrode unit due to machining error or the like, at least part of the abutting section can be elastically deformed in such a manner that the tapered pressure-receiving surface and the tapered outer circumferential surface make contact substantially equally. This makes it possible for heat to be generated substantially equally in the whole of the first joining surface and second joining surface to favorably join the first metal member and the second metal member.

Moreover, both the tapered pressure-receiving surface and at least part of the first joining surface are configured tapered inclining in the direction of getting closer to the axial center, from the one end side toward the other end side in the axial direction of the first metal member. Therefore, it can be suppressed that an electrification distance between the tapered pressure-receiving surface and the first joining surface varies in each region of the first joining surface, and it is thereby possible to achieve equalization of a generated heat amount in the first joining surface and the second joining surface. This too makes it possible for the first metal member and the second metal member to be favorably joined.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
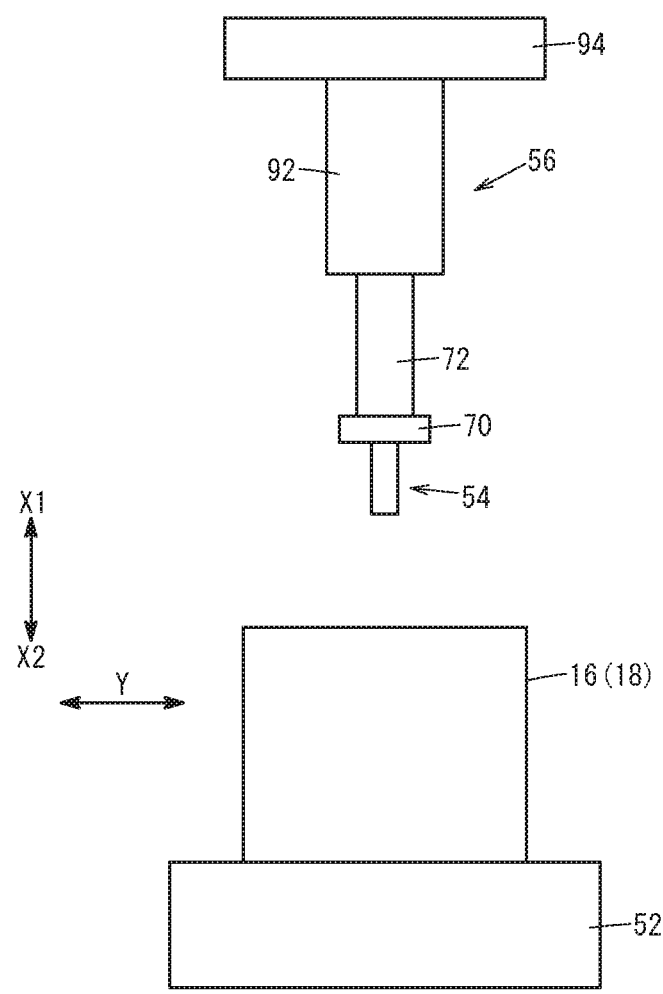
FIG. 1 is a principal part schematic configuration diagram of a joining apparatus according to an embodiment of the present invention.

A preferred embodiment of a joining apparatus and a method of joining according to the present invention will be presented and described in detail with reference to the accompanying drawings. Note that in the drawings below, configuration elements displaying the same or similar functions and advantages will be assigned with the same reference symbols, and repeated descriptions thereof will sometimes be omitted.

Figure 2:
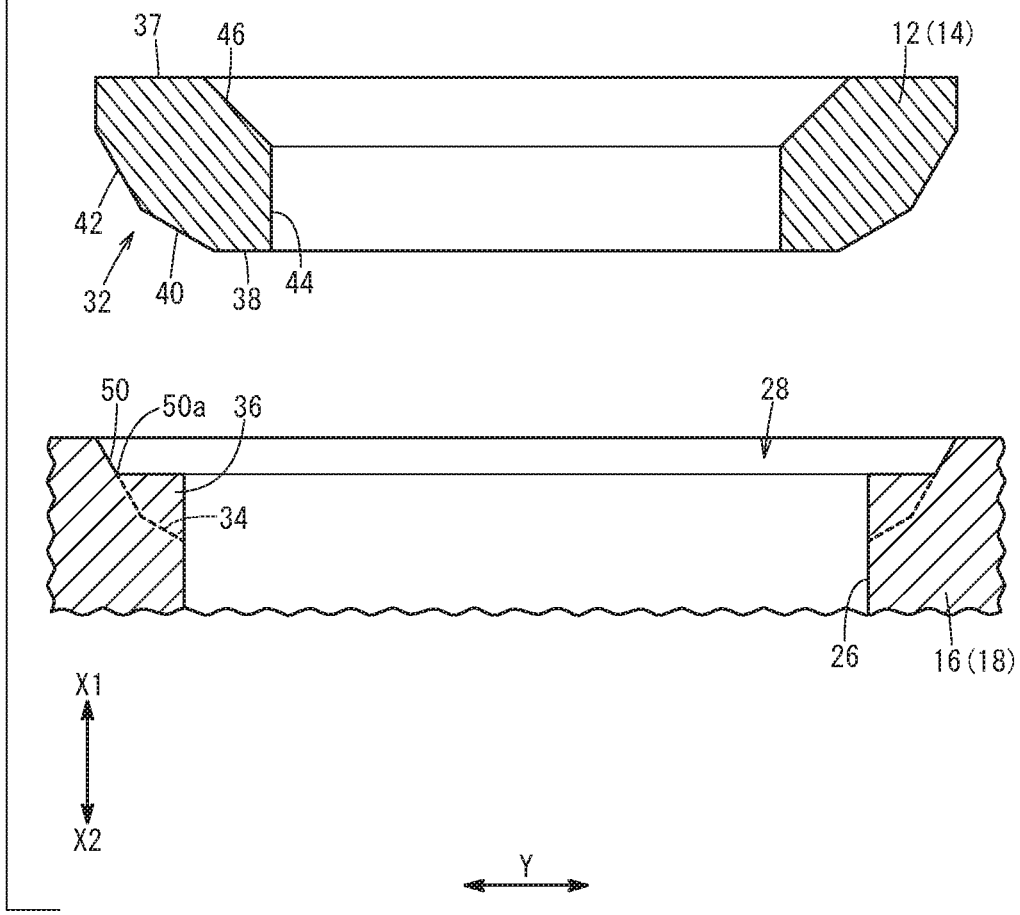
FIG. 2 is a cross-sectional view of a valve seat (a first metal member) and a cylinder head main body (a second metal member) capable of being joined by applying the joining apparatus of FIG. 1.
Figure 3:
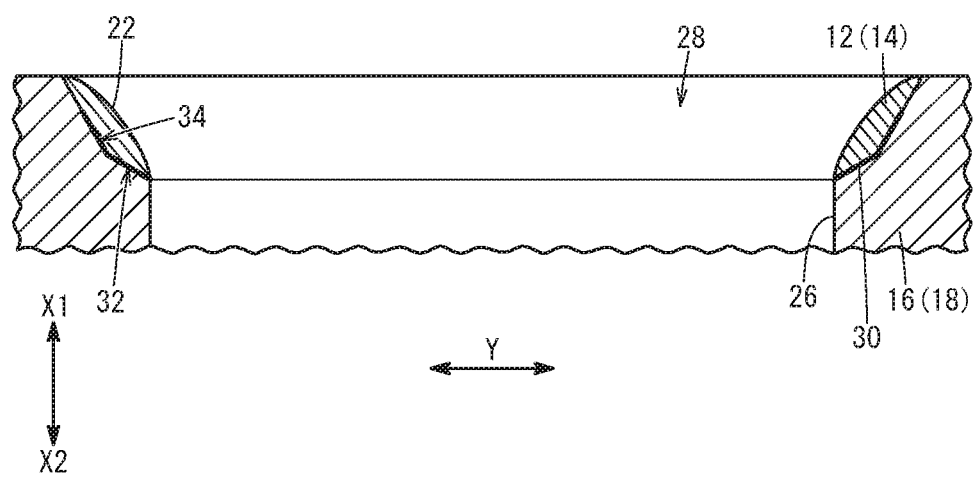
FIG. 3 is a principal part enlarged cross-sectional view of a cylinder head obtained by machining a joined body joining the valve seat and the cylinder head main body of FIG. 2.
Figure 9:
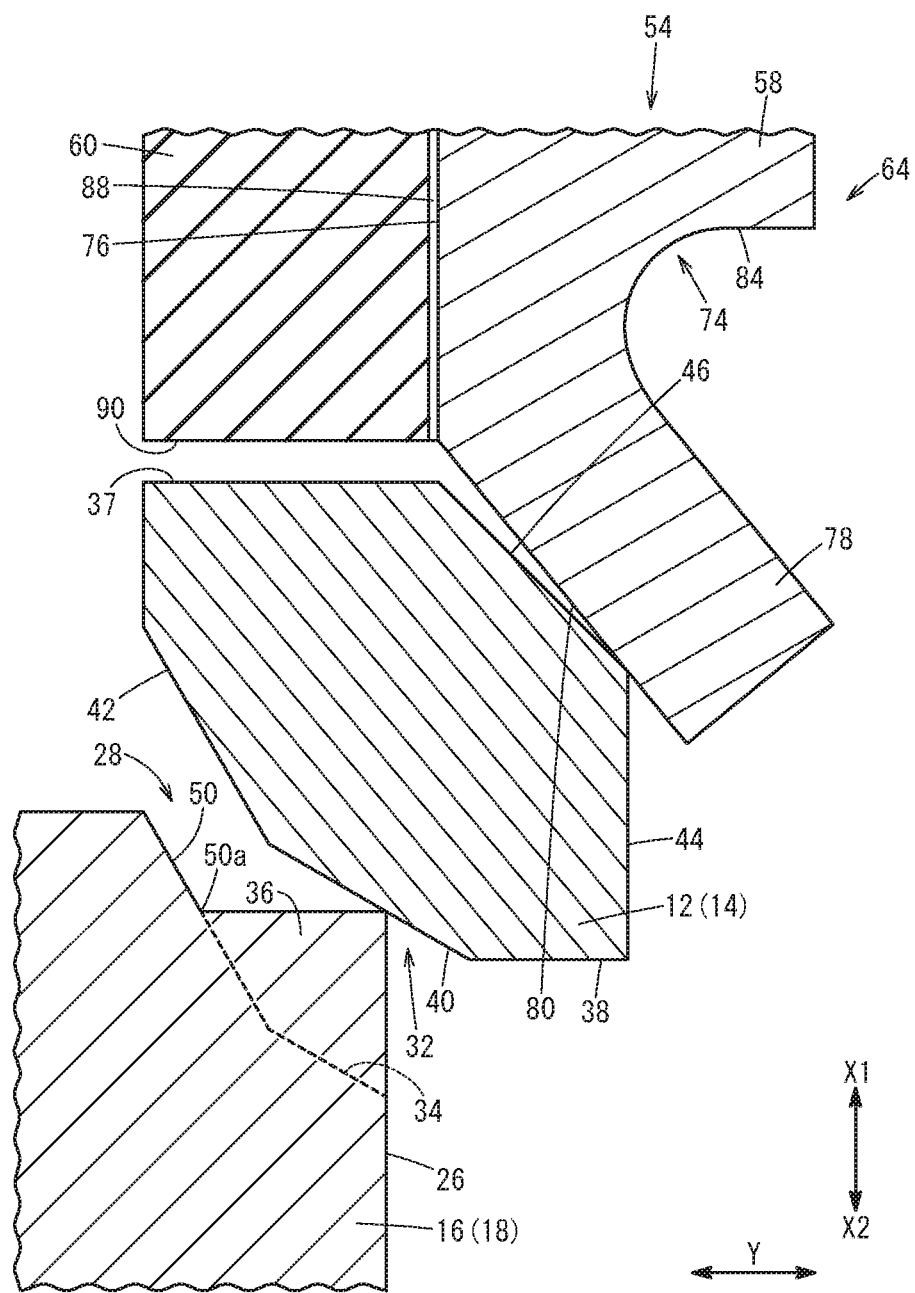
FIG. 9 is an explanatory drawing that explains what it looks like when a first joining surface of the valve seat of FIG. 8 and a projection provided in a second joining surface of the cylinder head main body have been abutted on each other.
Figure 10:
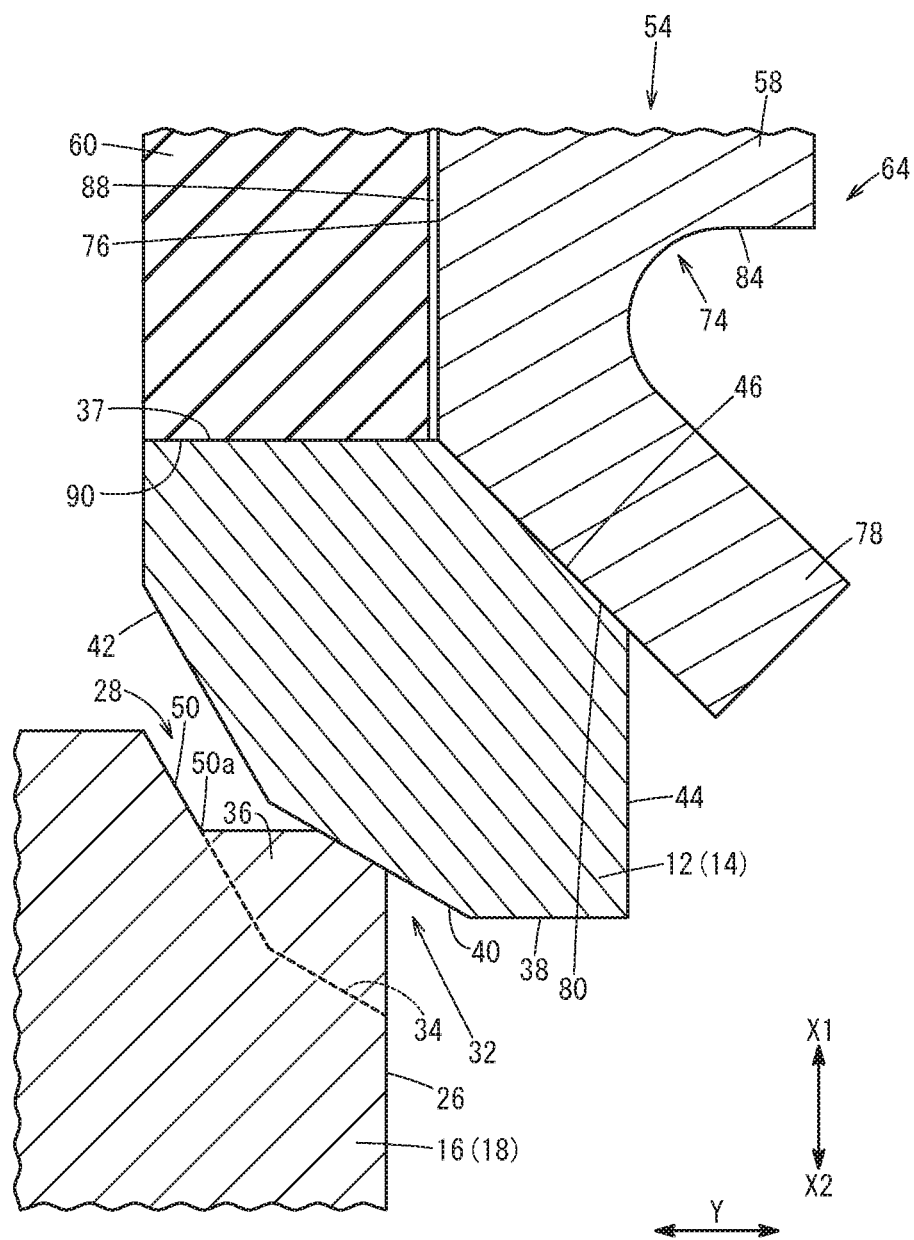
FIG. 10 is an explanatory drawing that explains what it looks like when the projection of FIG. 9 has been melted to bring the valve seat and the cylinder head main body close to each other.
Figure 11:
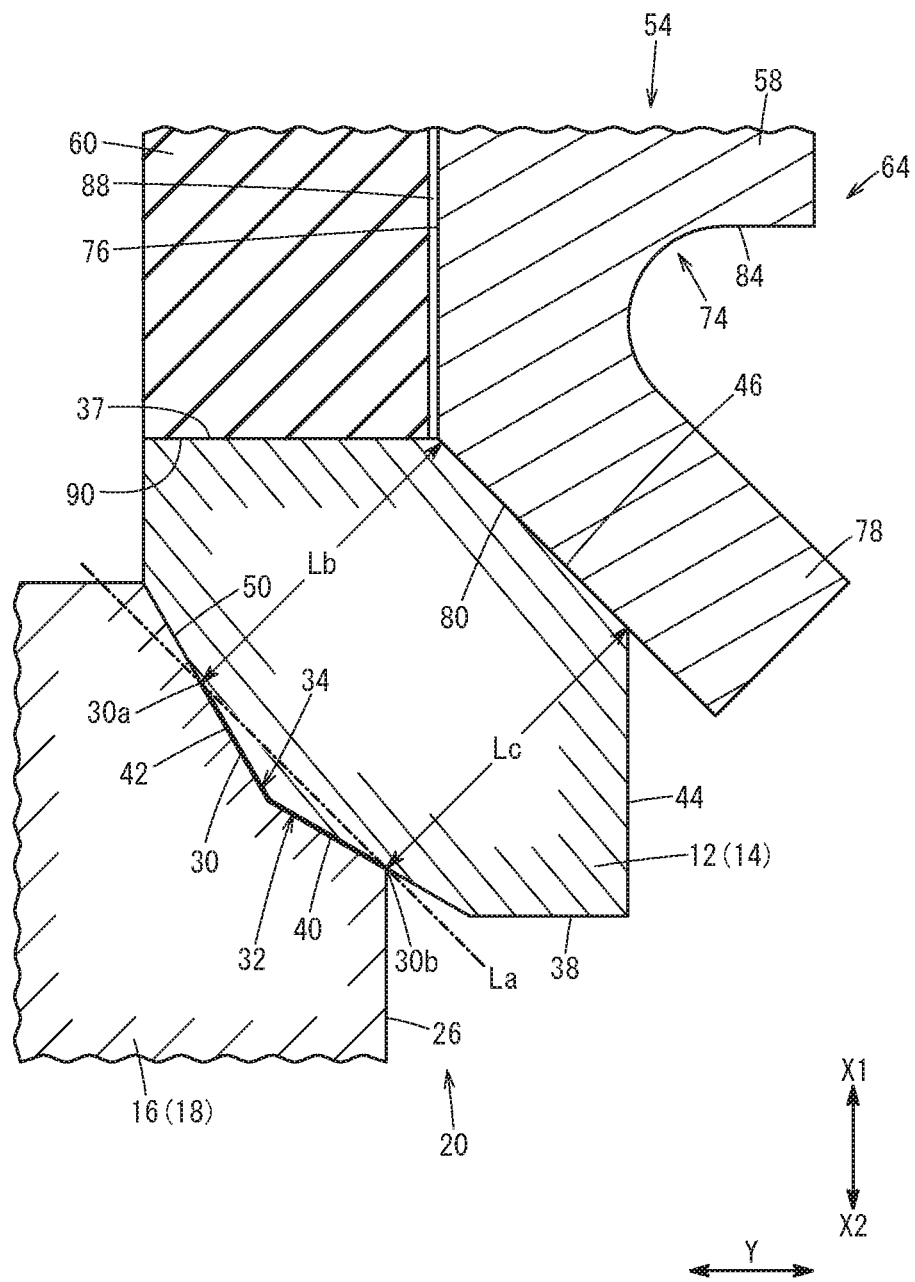
FIG. 11 is an explanatory drawing that explains what it looks like when the valve seat and the cylinder head main body of FIG. 10 have been brought even closer to each other to join the first joining surface and the second joining surface.

Described below is an example where, as shown in FIGS. 1-11, by applying a joining apparatus 10 according to the present embodiment, a first metal member 14 being a valve seat 12 and a second metal member 18 being a cylinder head main body 16 are joined to obtain a joined body 20 (refer to FIG. 11). By, for example, performing machining, and so on, using the likes of an unillustrated cutting apparatus, on the joined body 20 obtained using the joining apparatus 10 and, as shown in FIG. 3, forming a valve abutting surface 22 in the valve seat 12, a cylinder head 24 is obtained.

However, the first metal member 14 and the second metal member 18 capable of being joined by applying the joining apparatus 10 are not limited to the valve seat 12 and the cylinder head main body 16.

First, the cylinder head 24 will be briefly described with reference to FIG. 3. Ports 26 whose one end side (an arrow X1 side) respectively opens toward an unillustrated combustion chamber, is formed in the cylinder head main body 16. An insertion port 28 being an opening circumferential edge section on the one end side (the arrow X1 side) of the port 26 has inserted into it the valve seat 12 which is circular ring-shaped, and an outer circumferential surface of said valve seat 12 and an inner circumferential surface of the insertion port 28 are joined via a joining interface 30. Specifically, a first joining surface 32 provided in the outer circumferential surface of the valve seat 12 and a second joining surface 34 provided in the inner circumferential surface of the insertion port 28 are joined via the joining interface 30.

In the cylinder head 24, the valve seat 12 is provided with the valve abutting surface 22 that inclines in a diameter-increasing direction toward a combustion chamber side (the arrow X1 side), and by an unillustrated valve being seated in or separating from said valve abutting surface 22, the port 26 is configured capable of opening/closing. In other words, in the cylinder head 24, the valve seat 12 is joined to a position abutted on by the valve of the cylinder head main body 16.

Next, the valve seat 12 and the cylinder head main body 16 before joining, in other words, before becoming the joined body 20 will be described with reference to FIGS. 2, and 8-11. In the valve seat 12 before joining, the valve abutting surface 22 is not formed. Moreover, in the cylinder head main body 16 before joining, a projection 36 is provided in the second joining surface 34.

Note that as shown in FIG. 2, the valve seat 12 is inserted into the insertion port 28 from one end side (the arrow X1 side) toward the other end side (an arrow X2 side) in an axial direction of said insertion port 28, in a state of having been disposed in such a manner that their mutual axial directions (an arrow X1-X2 direction) coincide and their mutual radial directions (an arrow Y direction) will be parallel.

Hereafter, axial directions of the insertion port 28 and the valve seat 12 will also simply be called the axial direction, and radial directions of the insertion port 28 and the valve seat 12 will also simply be called the radial direction. Moreover, outer sides in the radial direction (the arrow Y direction) of the valve seat 12 and the insertion port 28 will also simply be called the outer side, and center sides in the radial direction (the arrow Y direction) of the valve seat 12 and the insertion port 28 will also simply be called the center side.

The valve seat 12 is circular ring-shaped being configured from a sintered body of a ferrous material such as a steel material, for example. Note that the valve seat 12 may further include a high electrical conductivity material such as a copper-based material. An orthogonal pressure-receiving surface 37 being an end surface on one end side in the axial direction of the valve seat 12 and a tip surface 38 being an end surface on the other end side in the axial direction of the valve seat 12 each have their planar direction orthogonal to the axial direction.

An outer circumferential surface of the valve seat 12 is provided with a first tapered section 40 and a second tapered section 42 whose planar directions differ from each other. The first tapered section 40 and the second tapered section 42 are each tapered inclining in a direction of getting closer to an axial center of the valve seat 12, from the one end side (the arrow X1 side) toward the other end side (the arrow X2 side) in the axial direction.

The first tapered section 40 is disposed more to the other end side (the arrow X2 side) than the second tapered section 42 is, and one end section (an arrow X1 side end section) of the first tapered section 40 and the other end section (an arrow X2 side end section) of the second tapered section 42 coincide. The other end section (the arrow X2 side) of the first tapered section 40 coincides with an end section on the outer side of the tip surface 38. As shown in FIG. 11, in the valve seat 12, a portion on the one end side (the arrow X1 side) of the first tapered section 40 and a portion on the other end side (the arrow X2 side) of the second tapered section 42 will be the first joining surface 32.

As shown in FIG. 2, a through-hole 44 is provided along the axial direction, in the axial center of the valve seat 12. A tapered pressure-receiving surface 46 that inclines in a direction of getting closer to the axial center from the one end side (the arrow X1 side) toward the other end side (the arrow X2 side) in the axial direction, is provided on one end side (the arrow X1 side) in an axial direction of the through-hole 44 and an inner circumferential side of the valve seat 12. The through-hole 44 extends from an end section on the other end side (the arrow X2 side) of the tapered pressure-receiving surface 46 toward the other end side (the arrow X2 side) in the axial direction. The orthogonal pressure-receiving surface 37 which is circular ring-shaped is provided more to an outer circumferential side than an end section on the one end side (the arrow X1 side) in the axial direction of the tapered pressure-receiving surface 46 is.

The cylinder head main body 16 is configured from an aluminum-based material of the likes of pure aluminum or an aluminum alloy, for example. As shown in FIG. 2, an inner circumferential surface of the insertion port 28 of the cylinder head main body 16 is provided with: the projection 36 projecting in a circular ring-shaped manner from the second joining surface 34; and a taper surface 50. When the joining interface 30 has been formed (refer to FIG. 11), the second joining surface 34 has a shape fitting with the first joining surface 32 of the valve seat 12.

The taper surface 50 is tapered extending in a diameter-increasing direction of the insertion port 28, from an end section on the one end side (the arrow X1 side) of the second joining surface 34, further toward the one end side (the arrow X1 side). By, for example, the taper surface 50 and the second tapered section 42 of the valve seat 12 having their mutual taper angle made substantially equal, or having an inclination angle of the taper surface 50 with respect to the axial direction slightly increased, and so on, the taper surface 50 and the second tapered section 42 of the valve seat 12 have each of their shapes set in such a manner that the valve seat 12 and the cylinder head main body 16 will be in a desired joining position relationship when a center side end section 50a of the taper surface 50 and the second tapered section 42 have been abutted on each other.

As shown in FIG. 11, in the joined body 20, the valve seat 12 and the cylinder head main body 16 are joined via the joining interface 30, and the valve abutting surface 22 (refer to FIG. 3) has not been provided in the valve seat 12. That is, in the valve seat 12 of the joined body 20, a portion on the center side thereof has not been removed by cutting. In this joined body 20, a planar direction of the joining interface 30 and a planar direction of the tapered pressure-receiving surface 46 are inclined with respect to a planar direction of the orthogonal pressure-receiving surface 37 of the valve seat 12.

Moreover, in the present embodiment, an orientation of a straight line La passing through an outer end section 30a being an end section on the outer side of the joining interface 30 and an inner end section 30b being an end section on the center side of the joining interface 30, and an orientation of the tapered pressure-receiving surface 46 are set so as to be substantially equal. Therefore, a shortest distance Lb between the outer end section 30a and the tapered pressure-receiving surface 46, and a shortest distance Lc between the inner end section 30b and the tapered pressure-receiving surface 46 are configured to be substantially equal.

Next, the joining apparatus 10 will be described with additional reference to FIGS. 1, and 4-6. The joining apparatus 10 is capable of resistance-welding the valve seat 12 and the cylinder head main body 16 by performing electrification, while applying to the valve seat 12 and the cylinder head main body 16 a pressurizing force having the axial direction as a pressurizing direction (the arrow X1-X2 direction), and, as shown in FIG. 1, mainly includes: an electrode structure 52; an electrifying/pressurizing head 54; a pressurizing means 56; and an unillustrated power supply, or the like.

The cylinder head main body 16 is set in the electrode structure 52. At this time, the electrode structure 52 and the cylinder head main body 16 contact each other to achieve an electrically connected state. The insertion port 28 of the cylinder head main body 16 that has been set in the electrode structure 52 faces an electrifying/pressurizing head 54 side.

Figure 4:
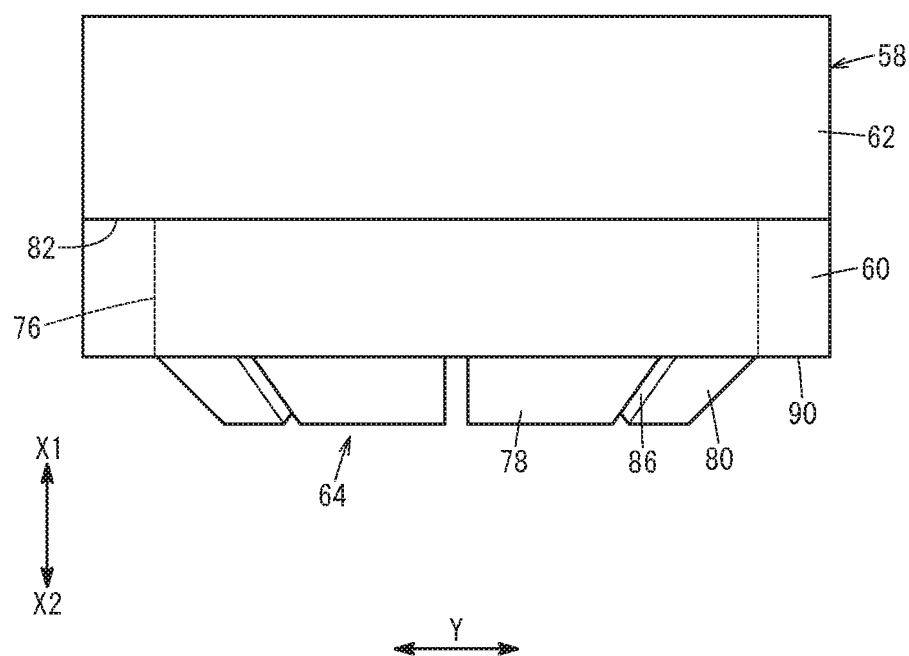
FIG. 4 is a front view of an electrifying/pressurizing head of the joining apparatus of FIG. 1.
Figure 5:
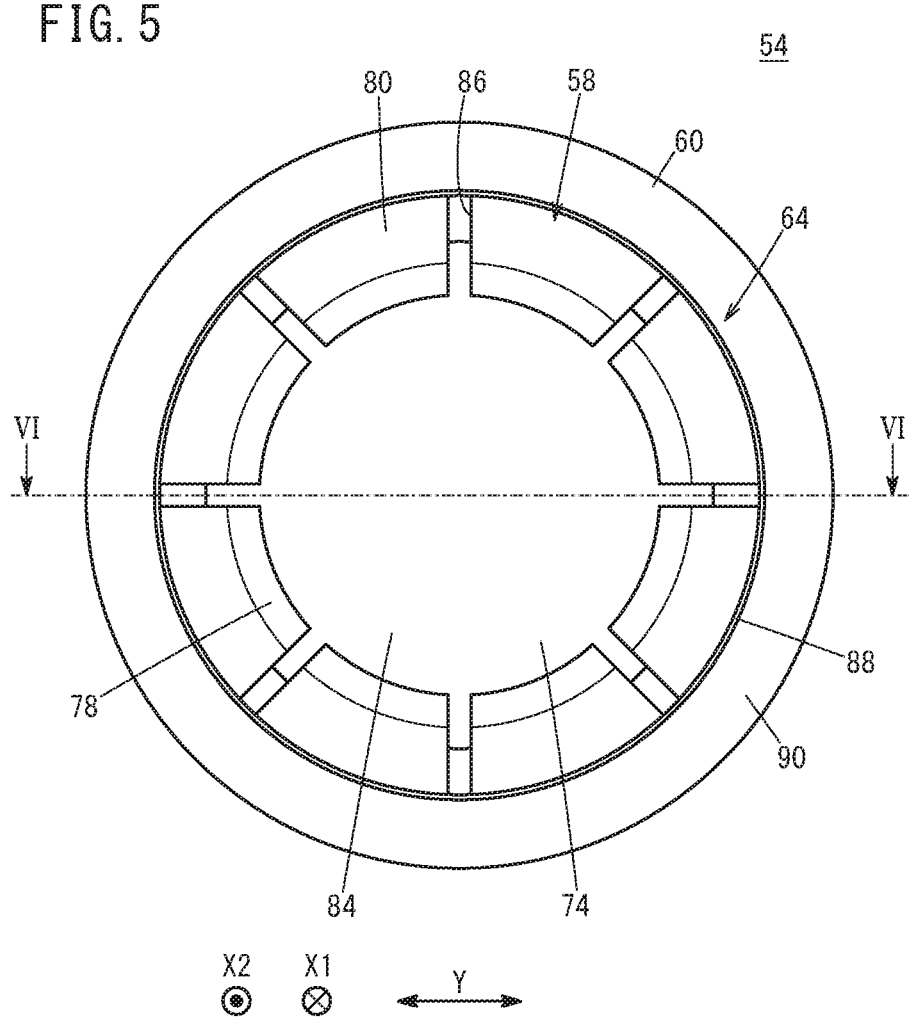
FIG. 5 is a bottom view of the electrifying/pressurizing head of FIG. 4.
Figure 6:
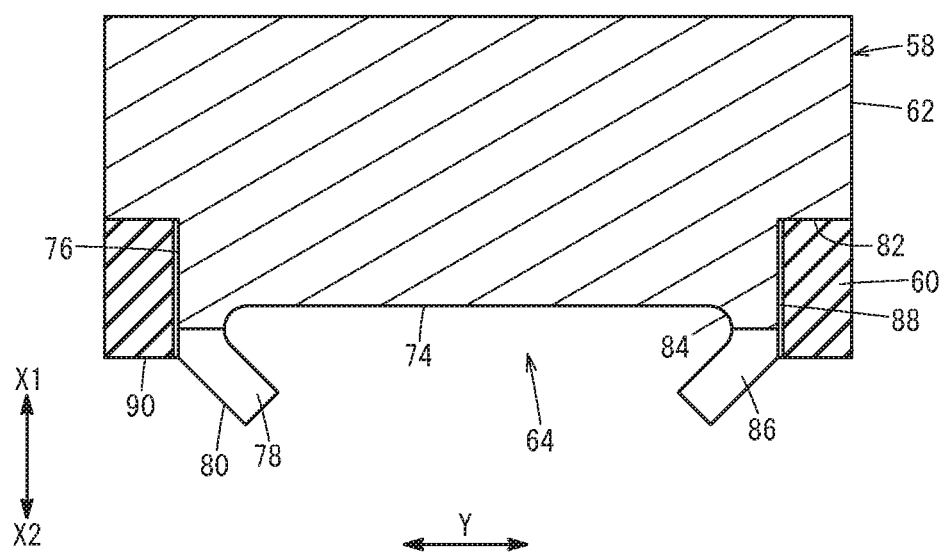
FIG. 6 is a cross-sectional view taken along the line VI-VI seen from the arrows direction, of FIG. 5.

As shown in FIGS. 4-6, the electrifying/pressurizing head 54 is configured by integrating an electrode unit 58 and an insulating member 60. The electrode unit 58 includes a main body section 62 and an abutting section 64. As shown in FIG. 1, one end side (the arrow X1 side) of the substantially circular column-shaped main body section 62 is fixed to a piston rod 72 of the pressurizing means 56, via a holder 70. Moreover, as shown in FIGS. 4 and 6, the abutting section 64 is arranged in a projecting manner on the other end side (the arrow X2 side) of the main body section 62.

The abutting section 64 is substantially circular ring-shaped being provided with a bottomed hole 74 opening to the other end side (the arrow X2 side), and includes: a base end section 76 provided on the one end side (the arrow X1 side); and a tapered plate section 78 provided on the other end side (the arrow X2 side). The base end section 76 has an outer circumferential surface extending along the axial direction, and the tapered plate section 78 has its outer circumference provided with a tapered outer circumferential surface 80. An outer diameter of the base end section 76 is smaller than an outer diameter of the main body section 62. Therefore, a level difference 82 is formed between the outer circumferential surface of the base end section 76 and an outer circumferential surface of the main body section 62. The insulating member 60 which is circular ring-shaped is arranged in this level difference 82.

The tapered plate section 78 is substantially circular ring-shaped inclining in a direction of getting closer to the axial center from the one end side (the arrow X1 side) toward the other end side (the arrow X2 side). Therefore, the tapered outer circumferential surface 80 provided on the outer circumference of the tapered plate section 78 also inclines in a direction of getting closer to the axial center from the one end side (the arrow X1 side) toward the other end side (the arrow X2 side). The tapered plate section 78 is set to a thickness enabling it to apply a pressurizing force to the tapered pressure-receiving surface 46 while elastically deforming, when the tapered outer circumferential surface 80 is brought into contact with the tapered pressure-receiving surface 46, as will be mentioned later. Moreover, although an inclination angle with respect to the axial direction of the tapered outer circumferential surface 80 is preferably set smaller than an inclination angle with respect to the axial direction of the tapered pressure-receiving surface 46 of the valve seat 12, each of the inclination angles may be the same or substantially the same.

As shown in FIG. 6, the one end side of an inner circumferential surface of the tapered plate section 78 is continuous with an inner surface of a recess 84 formed sunken in a center section on the other end side of the base end section 76, and the bottomed hole 74 is formed by the tapered plate section 78 and the recess 84. An area of a cross section orthogonal to the axial direction of the bottomed hole 74 is configured smaller on the other end side (the arrow X2 side) than on the one end side (the arrow X1 side) of said bottomed hole 74. Note that a bottom surface of the bottomed hole 74 may be provided with the likes of an opening of a screw hole (not illustrated) formed in a penetrating manner in the electrode unit 58 in order to attach the electrifying/pressurizing head 54 to the holder 70, as will be mentioned later.

In the abutting section 64, a plurality of slits 86 each having a shape formed by cutting out along the axial direction from an end section on the other end side (the arrow X2 side) of the tapered plate section 78 to part on the other end side (the arrow X2 side) of the base end section 76, are provided at intervals in a circumferential direction. In the present embodiment, as shown in FIG. 5, eight slits 86 are provided equally spaced in the abutting section 64. Note that the number, dimensions, shape, and so on, of the slits 86, are not particularly limited and moreover, the abutting section 64 need not be provided with the slits 86.

The insulating member 60 is configured from an insulating material, and is arranged in the level difference 82 so as to circle an outer circumference of the base end section 76, in other words, circle more to the one end side than the tapered outer circumferential surface 80 of the abutting section 64 is. In the present embodiment, an outer diameter of the insulating member 60 and an outer diameter of the main body section 62 are set the same or substantially the same. As shown in FIGS. 5 and 6, a non-joined section 88 where the insulating member 60 and the base end section 76 are not joined to each other, is formed between an inner circumferential surface of the insulating member 60 and the outer circumferential surface of the base end section 76.

Although in the present embodiment, as shown in FIG. 6, the non-joined section 88 is formed due to an inner diameter of the insulating member 60 being slightly larger than the outer diameter of the base end section 76, the present invention is not particularly limited to this, and the inner circumferential surface of the insulating member 60 and outer circumferential surface of the base end section 76 may contact each other in a non-joined state.

An end surface on the other end side of the insulating member 60 will be an orthogonal abutting surface 90 disposed more to an outer circumferential side than an end section on the one end side of the tapered outer circumferential surface 80 is, and whose planar direction is orthogonal to the axial direction. In the present embodiment, a shape of the orthogonal abutting surface 90 is configured the same or substantially the same as a shape of the orthogonal pressure-receiving surface 37 of the valve seat 12. In the electrifying/pressurizing head 54, as shown in FIG. 11, there is a configuration enabling the tapered plate section 78 of the abutting section 64 to be inserted into an inside of the valve seat 12 from the one end side toward the other end side, to be pressed onto the inside of the valve seat from the one end side toward the other end side. As a result, the tapered plate section 78 is elastically deformed, whereby the tapered outer circumferential surface 80 contacts the tapered pressure-receiving surface 46, and the orthogonal abutting surface 90 contacts the orthogonal pressure-receiving surface 37.

As shown in FIG. 1, the pressurizing means 56 includes a pressurizing cylinder 92 configured from the likes of a hydraulic cylinder or an air cylinder, for example. The one end side (the arrow X1 side) of the pressurizing cylinder 92 is fixed to a support 94, and the other end side (the arrow X2 side) of the pressurizing cylinder 92 is provided with the piston rod 72 which is capable of advancing/retracting in the pressurizing direction. The electrifying/pressurizing head 54 is fixed to the other end side of the piston rod 72, via the holder 70.

Therefore, in the pressurizing means 56, by advancing the piston rod 72, the electrifying/pressurizing head 54 and the electrode structure 52 can be relatively brought close to each other along the pressurizing direction (the axial direction). As a result, a pressurizing force along the axial direction can be applied to the valve seat 12 and the cylinder head main body 16 that have been set between the electrifying/pressurizing head 54 and the electrode structure 52.

The power supply is electrically connected to the electrode unit 58 of the electrifying/pressurizing head 54 and to the electrode structure 52. By switching on the power supply, electrification can be performed between the electrode unit 58 and the electrode structure 52. As a result, a current flows from the valve seat 12 to the cylinder head main body 16 via the tapered pressure-receiving surface 46 contacting the tapered outer circumferential surface 80.

Next, a method of joining that joins the valve seat 12 and the cylinder head main body 16 using the joining apparatus 10 will be described mainly with reference to FIGS. 1, and 7-11.

Figure 7:
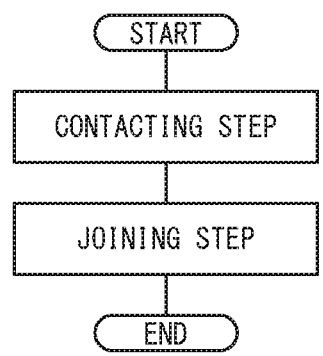
FIG. 7 is a flowchart showing one example of a method of joining according to the embodiment of the present invention.
Figure 8:
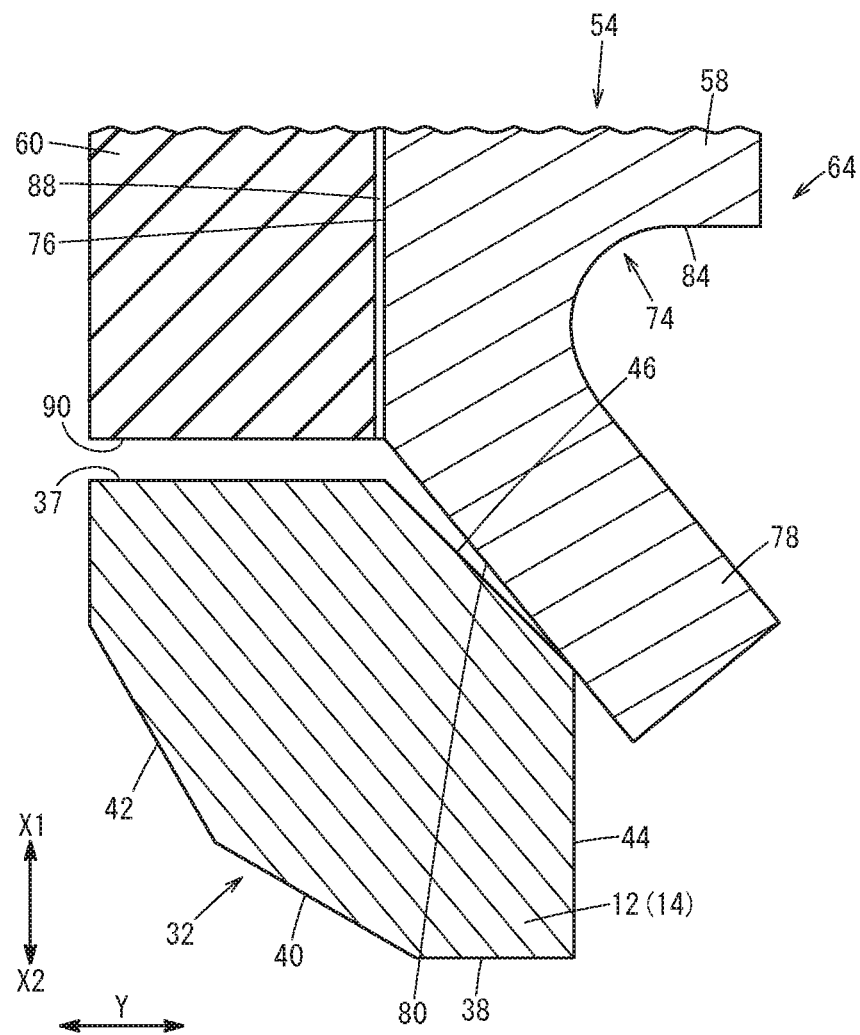
FIG. 8 is an explanatory drawing that explains what it looks like when the valve seat has been set in the electrifying/pressurizing head.

In this method of joining, as shown in FIG. 7, first, a contacting step is performed. In the contacting step, as shown in FIG. 1, the cylinder head main body 16 is set in the electrode structure 52 to bring them into contact with each other. Moreover, as shown in FIG. 8, the valve seat 12 is set in the electrifying/pressurizing head 54. Specifically, the tapered plate section 78 of the abutting section 64 is inserted into an inner side of the tapered pressure-receiving surface 46 and the through-hole 44 of the valve seat 12, whereby part on the other end side of the tapered outer circumferential surface 80 and part on the other end side of the tapered pressure-receiving surface 46 are brought into contact with each other. In this contacting step, an inclination angle with respect to the axial direction of the tapered outer circumferential surface 80 is in a state of being smaller than an inclination angle with respect to the axial direction of the tapered pressure-receiving surface 46, and the one end side of the tapered outer circumferential surface 80 and the one end side of the tapered pressure-receiving surface 46 are separated from each other.

Next, as shown in FIG. 7, a joining step is performed. In the joining step, the electrifying/pressurizing head 54 and the electrode structure 52 are brought close to each other under action of the pressurizing means 56, whereby, first, as shown in FIG. 9, the first tapered section 40 (the first joining surface 32) of the valve seat 12 that has been set in the electrifying/pressurizing head 54, and the projection 36 of the cylinder head main body 16 are abutted on each other. At this time, the taper surface 50 of the cylinder head main body 16 and the second tapered section 42 of the valve seat 12 face each other at an interval.

Next, the electrifying/pressurizing head 54 and the electrode structure 52 are brought even closer to each other to press the tapered plate section 78 of the abutting section 64 onto the tapered pressure-receiving surface 46 of the valve seat 12, whereby the tapered plate section 78 is elastically deformed in such a manner that its inclination angle with respect to the axial direction increases. As a result, as shown in FIG. 10, a pressurizing force can be applied to the valve seat 12 and the cylinder head main body 16 in a state where the whole of the tapered outer circumferential surface 80 and the whole of the tapered pressure-receiving surface 46 have contacted each other, and the orthogonal abutting surface 90 and the orthogonal pressure-receiving surface 37 have contacted each other.

After the whole of the tapered outer circumferential surface 80 and the whole of the tapered pressure-receiving surface 46 have been brought into contact with each other, the power supply is switched on, and electrification is performed between the electrode unit 58 and the electrode structure 52, via the tapered outer circumferential surface 80. At this time, the orthogonal pressure-receiving surface 37 and the electrode unit 58 are insulated from each other via the orthogonal abutting surface 90.

When resistance welding is started by performing electrification and pressurization as described above, a contact section of the valve seat 12 and the cylinder head main body 16 generates heat due to contact resistance, and the projection 36 begins to melt. When the valve seat 12 and the cylinder head main body 16 are brought close to each other while the melted projection 36 is being discharged from between the first joining surface 32 and the second joining surface 34, a contact area of the melted projection 36 and the first joining surface 32 increases.

Then, when substantially the whole of the projection 36 melts, the joining interface 30 is formed between the first joining surface 32 and the second joining surface 34, and a region more to the one end side (the arrow X1 side) than the first joining surface 32 is, of the second tapered section 42, and the center side end section 50a of the taper surface 50, are abutted on each other, as shown in FIG. 11. Resistance welding is finished by stopping electrification at a timing immediately before the region more to the one end side than the first joining surface 32 is, of the second tapered section 42, and the center side end section 50a of the taper surface 50 make contact in this way, or simultaneously with their contact. As a result, the joined body 20 can be obtained with the valve seat 12 and the cylinder head main body 16 joined with a desired positional relationship.

As is clear from the above, in the joining step in the method of joining using the joining apparatus 10 according to the present embodiment, the tapered outer circumferential surface 80 is brought into contact with the tapered pressure-receiving surface 46 to apply the pressurizing force, in a state where the tapered plate section 78 of the abutting section 64 has been elastically deformed. In other words, even when variation in shape, and so on, has occurred in the tapered pressure-receiving surface 46 of the valve seat 12 or the tapered outer circumferential surface 80 of the electrode unit 58 due to machining error, or the like, the tapered plate section 78 can be elastically deformed in such a manner that the whole of the tapered pressure-receiving surface 46 and the whole of the tapered outer circumferential surface 80 make contact substantially uniformly. This makes it possible for heat to be generated substantially uniformly in the whole of the first joining surface 32 and second joining surface 34, whereby the valve seat 12 and the cylinder head main body 16 are favorably joined.

Moreover, both the first tapered section 40 and second tapered section 42 of the first joining surface 32 (the joining interface 30) and the tapered pressure-receiving surface 46 are configured tapered inclining in the direction of getting closer to the axial center from the one end side toward the other end side in the axial direction. In particular, in the above-described embodiment, as shown in FIG. 11, the orientation of the straight line La passing through the outer end section 30a and inner end section 30b of the joining interface 30, and the orientation of the tapered pressure-receiving surface 46, are set so as to be substantially equal, and the shortest distance Lb and shortest distance Lc are configured to be substantially equal. Therefore, it can be suppressed that the electrification distance between the first joining surface 32 and the tapered pressure-receiving surface 46 varies in each region of the first joining surface 32, and it is thereby possible to achieve uniformity of the generated heat amount in the first joining surface 32 and the second joining surface 34. This too makes it possible for the valve seat 12 and the cylinder head main body 16 to be favorably joined.

In the joining apparatus 10 according to the above-described embodiment, a configuration has been adopted that the abutting section 64 includes the tapered plate section 78 extending in a tapered manner getting closer to the axial center from the one end side toward the other end side, and the tapered outer circumferential surface 80 is provided on the outer circumference of the tapered plate section 78. In this case, the tapered plate section 78 can be easily elastically deformed in such a manner that the whole of the tapered pressure-receiving surface 46 and the whole of the tapered outer circumferential surface 80 favorably make contact, according to a shape of said tapered pressure-receiving surface 46. As a result, even when variation in shape due to machining error, and so on, has occurred, the valve seat 12 and the cylinder head main body 16 can be favorably joined to suppress variation in joining quality. Consequently, it becomes possible for mass production efficiency of the joined body 20 to be improved.

In the joining apparatus 10 according to the above-described embodiment, a configuration has been adopted that the inclination angle with respect to the axial direction of the tapered outer circumferential surface 80 is smaller than the inclination angle with respect to the axial direction of the tapered pressure-receiving surface 46. In this case, by pressing the tapered outer circumferential surface 80 onto the tapered pressure-receiving surface 46, the tapered plate section 78 can be elastically deformed in a direction by which the inclination angle with respect to the axial direction of the tapered outer circumferential surface 80 increases. This makes it possible for the pressurizing force to be applied in a state where the whole of the tapered outer circumferential surface 80 has been elastically biased toward the whole of the tapered pressure-receiving surface 46 thereby favorably bringing them into contact with each other, and hence makes it possible for joining quality between the valve seat 12 and the cylinder head main body 16 to be effectively increased by a simple configuration.

In the joining apparatus 10 according to the above-described embodiment, a configuration has been adopted that the plurality of slits 86 each directed from the end section on the other end side in the axial direction of the abutting surface 64 toward the one end side are provided at intervals in the circumferential direction of the abutting section 64. In this case, it is made easier for elastic deformation to occur in the whole of the tapered plate section 78, thereby making it possible for the whole of the tapered pressure-receiving surface 46 and the whole of the tapered outer circumferential surface 80 to be even more favorably brought into contact with each other.

In the joining apparatus 10 according to the above-described embodiment, a configuration has been adopted that the orthogonal abutting surface 90 orthogonal to the axial direction of the abutting section 64 is provided more to the outer circumferential side than the end section on the one end side of the tapered outer circumferential surface 80 is, and the orthogonal abutting surface 90 contacts the orthogonal pressure-receiving surface 37 orthogonal to the axial direction of the first metal member 14 (the valve seat 12), provided more to the outer circumferential side than the end section on the one end side of the tapered pressure-receiving surface 46 is, to apply the pressurizing force. In this case, due to the orthogonal abutting surface 90 and the orthogonal pressure-receiving surface 37 that are orthogonal to the pressurizing direction being brought into contact with each other, the pressurizing force can be effectively and stably applied. As a result, occurrence of bending, and so on, in the valve seat 12, and so on, can be suppressed during electrification and pressurization, thereby making it possible for the valve seat 12 and the cylinder head main body 16 to be even more favorably joined.

In the joining apparatus 10 according to the above-described embodiment, a configuration has been adopted that the orthogonal abutting surface 90 is configured from an insulating material. Since the joining interface 30 is tapered as described above, and the orthogonal pressure-receiving surface 37 is orthogonal to the axial direction, the distance between the joining interface 30 and the orthogonal pressure-receiving surface 37 will have a different length for each portion of the joining interface 30. Even in this case, it can be suppressed that the electrification distance varies in each portion of the joining interface 30, since the orthogonal pressure-receiving surface 37 is configured from an insulating material and it is suppressed that an electrification path is formed between the orthogonal pressure-receiving surface 37 and the joining interface 30.

On the other hand, since the planar direction of the tapered pressure-receiving surface 46 inclines according to the planar direction of the joining interface 30 (the first joining surface 32) as described above, the electrification distance between the tapered outer circumferential surface 80 and the joining interface 30 is substantially uniform. As a result, heat can be generated substantially uniformly in the whole of the first joining surface 32 and the second joining surface 34, hence making it possible for the valve seat 12 and the cylinder head main body 16 to be even more favorably joined.

In the method of joining according to the above-described embodiment, a configuration has been adopted that the abutting section 64 includes the tapered plate section 78 extending in a tapered manner getting closer to the axial center from the one end side toward the other end side, the tapered outer circumferential surface 80 is provided on the outer circumference of the tapered plate section 78, and, in the joining step, the tapered outer circumferential surface 80 is brought into contact with the tapered pressure-receiving surface 46 to apply the pressurizing force, in a state where the tapered plate section 78 has been elastically deformed in such a manner that its inclination angle with respect to the axial direction increases. In this case, the tapered plate section 78 can be easily elastically deformed in such a manner that the whole of the tapered pressure-receiving surface 46 and the whole of the tapered outer circumferential surface 80 favorably make contact, according to the shape of said tapered pressure-receiving surface 46. Moreover, the pressurizing force can be applied in a state that the whole of the tapered outer circumferential surface 80 has been elastically biased toward the whole of the tapered pressure-receiving surface 46 favorably bringing them into contact with each other. As a result of these points, joining quality of the valve seat 12 and the cylinder head main body 16 can be effectively increased by a simple configuration. Moreover, since variation in joining quality can be suppressed regardless of whether or not variation in shape due to machining error, and so on, has occurred, it becomes possible for mass production efficiency of the joined body 20 to be improved.

In the method of joining according to the above-described embodiment, a configuration has been adopted that the orthogonal abutting surface 90 orthogonal to the axial direction of the abutting section 64 is provided more to the outer circumferential side than the end section on the one end side of the tapered outer circumferential surface 80 is, the orthogonal pressure-receiving surface 37 orthogonal to the axial direction of the first metal member 14 (the valve seat 12) is provided more to the outer circumferential side than the end section on the one end side of the tapered pressure-receiving surface 46 is, and, in the joining step, the tapered outer circumferential surface 80 is brought into contact with the tapered pressure-receiving surface 46, and the orthogonal abutting surface 90 is brought into contact with the orthogonal pressure-receiving surface 37, to apply the pressurizing force. In this case, occurrence of bending, and so on, in the valve seat 12, and so on, can be suppressed during electrification and pressurization, thereby making it possible for the valve seat 12 and the cylinder head main body 16 to be favorably joined.

In the method of joining according to the above-described embodiment, a configuration has been adopted that the orthogonal abutting surface 90 is configured from an insulating material, and, in the joining step, electrification is performed between the tapered outer circumferential surface 80 and the electrode structure 52 in a state that the orthogonal pressure-receiving surface 37 and the electrode unit 58 have been insulated from each other via the orthogonal abutting surface 90. In this case, it can be suppressed that the length of the electrification distance varies for each portion of the joining interface 30, hence heat is generated substantially uniformly in the whole of the first joining surface 32 and second joining surface 34, whereby the valve seat 12 and the cylinder head main body 16 can be even more favorably joined.

The present invention is not particularly limited to the above-described embodiment, and may be modified variously in a range not departing from the spirit of the present invention.

For example, although in the above-described embodiment, a configuration was adopted that the abutting section 64 was provided with the tapered plate section 78, and the whole of said tapered plate section 78 had a thickness that was elastically deformable, the present invention is not particularly limited to this. All that is required is that at least part of the abutting section 64 has a thickness elastically deformable in such a manner that the tapered outer circumferential surface 80 fits the tapered pressure-receiving surface 46.

The electrifying/pressurizing head 54 need not be provided with the orthogonal abutting surface 90. The orthogonal abutting surface 90 need not be configured from an insulating material. The electrifying/pressurizing head 54 need not include the insulating member 60. The non-joined section 88 need not be provided between the inner circumferential surface of the insulating member 60 and the electrode unit 58.

The shape of the outer circumferential surface of the valve seat 12 is not limited to that of the above-described embodiment, one tapered section may be provided instead of two tapered sections, that is, the first tapered section 40 and the second tapered section 42 whose planar directions differ from each other, or three or more tapered sections may be provided. Moreover, an arc section may be provided instead of the first tapered section 40 and the second tapered section 42. Moreover, although in the above-described embodiment, a configuration was adopted that the orientation of the straight line La and orientation of the tapered pressure-receiving surface 46 with respect to the axial direction were set to be substantially equal, the present invention is not particularly limited to this.

What is claimed is:

1. A joining apparatus for joining a first joining surface and a second joining surface by electrification and pressure, the first joining surface provided on an outer circumferential side of a circular ring-shaped first metal member, and the second joining surface provided on an inner circumferential side of an insertion port of a second metal member into which the first metal member is inserted,
   at least part of the first joining surface being tapered inclining in a direction of getting closer to an axial center of the first metal member, from one end side toward the other end side in an axial direction of the first metal member,
   an inner circumferential side of the first metal member being provided with a tapered pressure-receiving surface inclining in the direction of getting closer to the axial center of the first metal member, from the one end side toward the other end side,
   the joining apparatus comprising an electrode unit having an abutting section,
   the abutting section being provided with a tapered outer circumferential surface that is configured to contact the tapered pressure-receiving surface when being inserted from the one end side toward the other end side into an inside of the first metal member,
   the tapered outer circumferential surface inclining in a direction of getting closer to an axial center of the abutting section as well as in an axial direction of the abutting section,
   at least part of the abutting section having a thickness capable of elastically deforming in such a manner that, during application of a pressurizing force to the first metal member and the second metal member, the tapered outer circumferential surface fits the tapered pressure-receiving surface,
   the abutting section is provided with at least one slit extending from a tip of the abutting section to a base end of the abutting section,
   wherein the at least one slit comprises a plurality of slits each of which extend from the tip of the abutting section to the base end of the abutting section, and wherein the plurality of slits are provide at intervals in a circumferential direction of the abutting section.

2. The joining apparatus according to claim 1, wherein the abutting section has a tapered plate section extending in a tapered manner getting closer to the axial center of the abutting section and extending in the axial direction of the abutting section, and the tapered outer circumferential surface is provided on an outer circumference of the tapered plate section.

3. The joining apparatus according to claim 2, wherein an inclination angle of the tapered outer circumferential surface with respect to an axial center of the electrode unit is smaller than an inclination angle of the tapered pressure-receiving surface with respect to the axial center of the first metal member.

4. The joining apparatus according to claim 1, further comprising:
   an orthogonal abutting surface that is orthogonal to an axial direction of the abutting section and is provided adjacent to the base end of the abutting section in a radial direction of the abutting section, and
   the orthogonal abutting surface configured to apply the pressurizing force by contacting an orthogonal pressure-receiving surface that is orthogonal to the axial direction of the first metal member and is provided adjacent to the tapered pressure-receiving surface in a radial direction of the first metal member.

5. The joining apparatus according to claim 4, wherein the orthogonal abutting surface comprises an insulating material.

* * * * *